United States Patent [19]

Nakahata et al.

[11] 4,385,829
[45] May 31, 1983

[54] IMAGE DEVELOPING METHOD AND DEVICE THEREFOR

[75] Inventors: Kimio Nakahata, Yokohama; Koichi Tanigawa; Hiroyuki Adachi, both of Tokyo; Tsuyoshi Watanabe, Kawasaki, all of Japan

[73] Assignee: Canon Kabushiki Kaisha, Tokyo, Japan

[21] Appl. No.: 238,634

[22] Filed: Feb. 26, 1981

[30] Foreign Application Priority Data

Mar. 4, 1980 [JP] Japan .................................. 55/27729
Mar. 6, 1980 [JP] Japan .................................. 55/28645

[51] Int. Cl.³ .......................................... G03G 15/09
[52] U.S. Cl. .............................. 355/3 DD; 118/658; 355/77; 430/122
[58] Field of Search ................. 430/31, 120, 122; 118/656, 657, 658; 355/3 DD, 77

[56] References Cited

U.S. PATENT DOCUMENTS

| | | | |
|---|---|---|---|
| 2,839,400 | 6/1958 | Moncrieffe-Yeates | 96/1 |
| 3,166,432 | 1/1965 | Gundlach | 430/120 |
| 3,232,190 | 2/1966 | Willmott | 95/1.7 |
| 3,909,258 | 9/1975 | Kotz | 430/31 X |
| 3,950,089 | 4/1976 | Fraser et al. | 355/3 DD |
| 4,292,387 | 9/1981 | Kanbe et al. | 118/657 |

OTHER PUBLICATIONS

*IBM Tech. Disc. Bull.*, p. 1251, vol. 15, No. 4, Sep. 1972.

*Primary Examiner*—R. L. Moses
*Attorney, Agent, or Firm*—Fitzpatrick, Cella, Harper & Scinto

[57] ABSTRACT

An electrostatic latent image developing method and a device therefor, featured in supplying one-component magnetic developer onto a developer-feeding non-magnetic bearing member to form thereon a magnetic brush of developer under the effect of a magnetic field, then bringing said magnetic brush into contact with the surface of an image-developing developer bearing member to form thereon a thin uniform layer of the developer, and bringing said thin layer to a developing position to develop an electrostatic latent image formed on a latent image bearing member. At the development the thin layer of the developer is so spaced in the developing position from the latent image bearing surface as to form a clearance therebetween, across which an AC bias electric field is applied.

20 Claims, 18 Drawing Figures

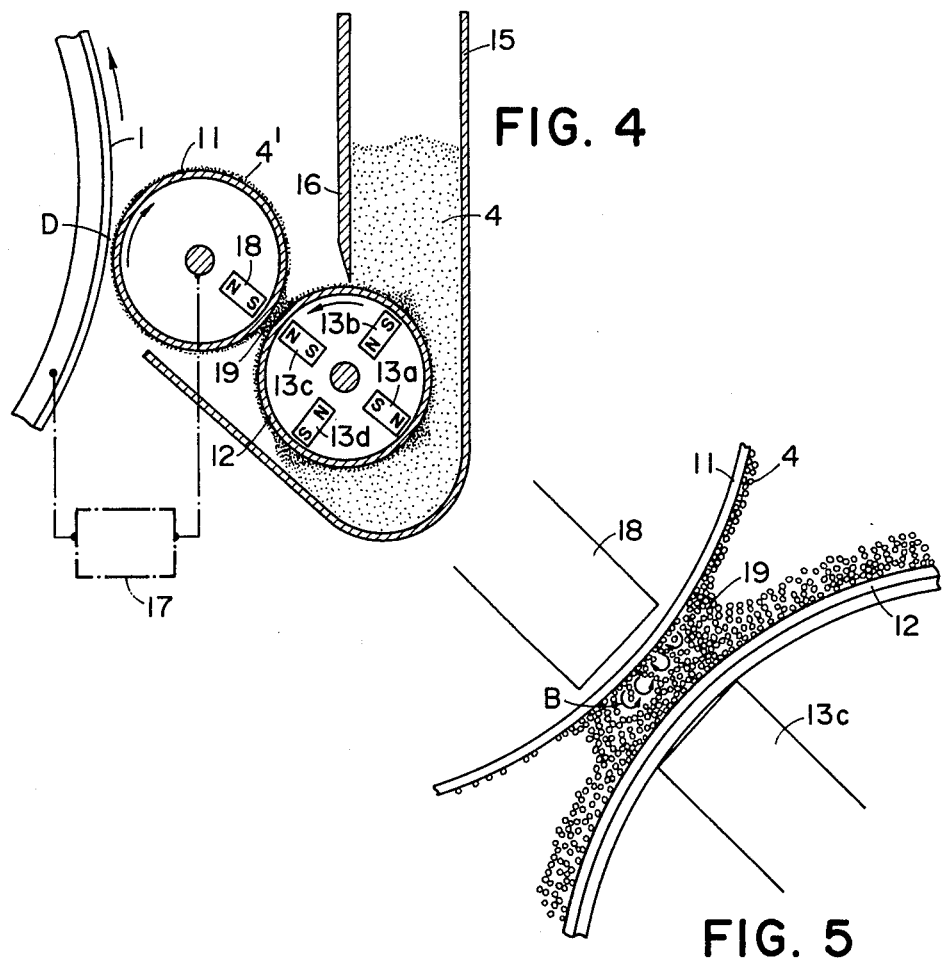
FIG. 4
FIG. 5
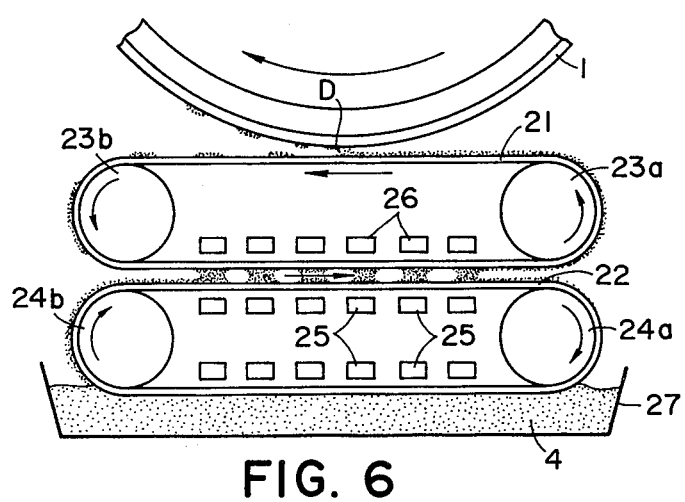
FIG. 6

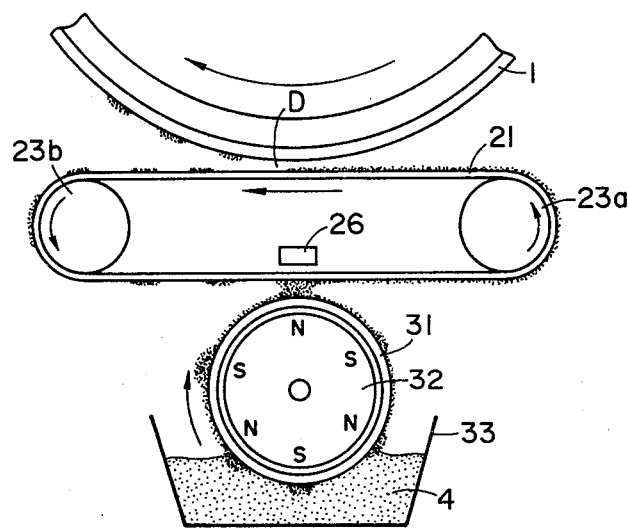
FIG. 7
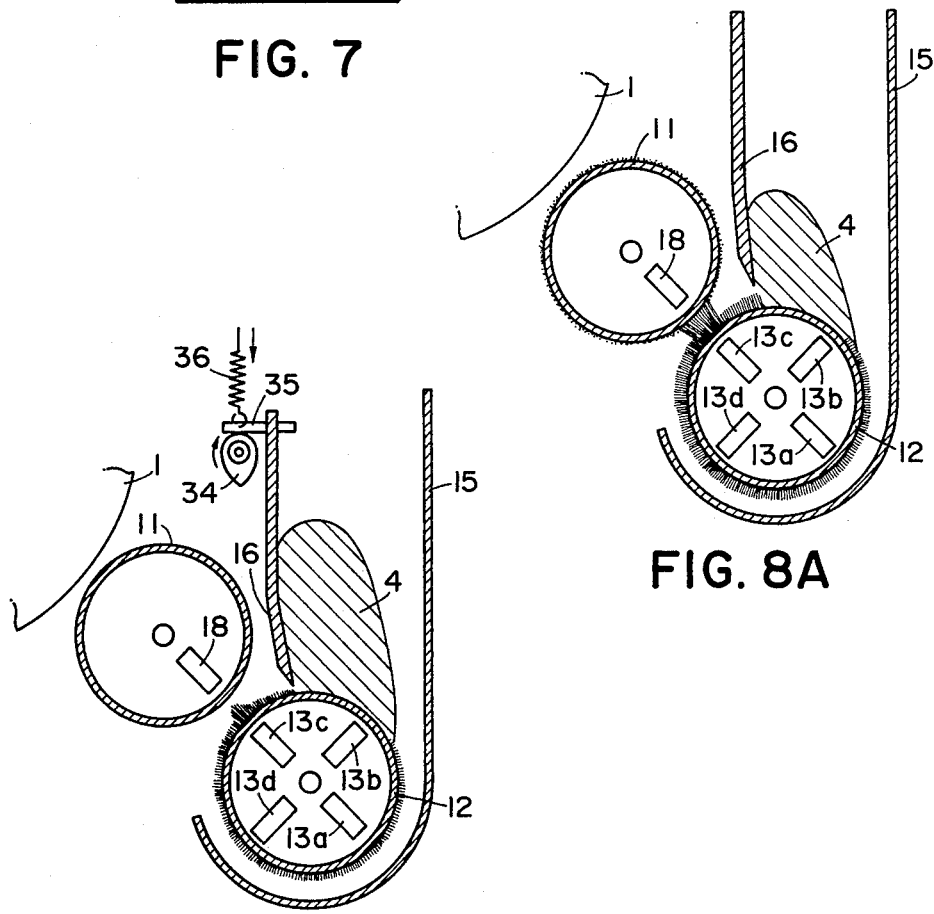
FIG. 8A
FIG. 8B

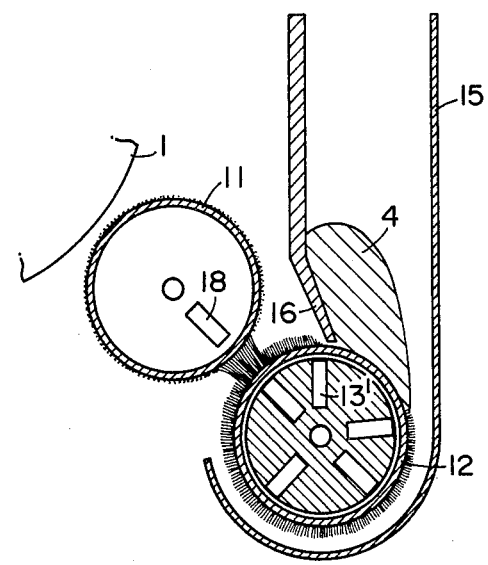
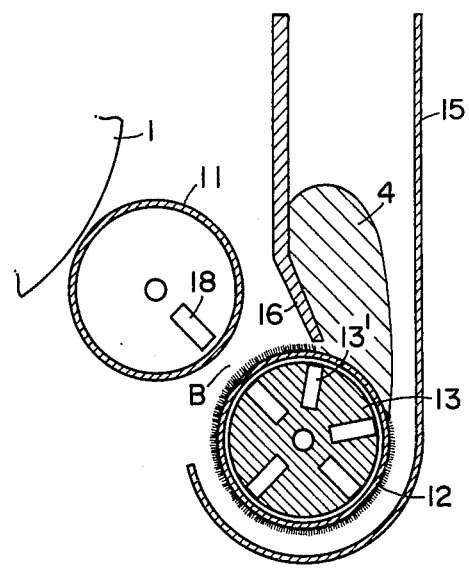
FIG. 9A · FIG. 9B
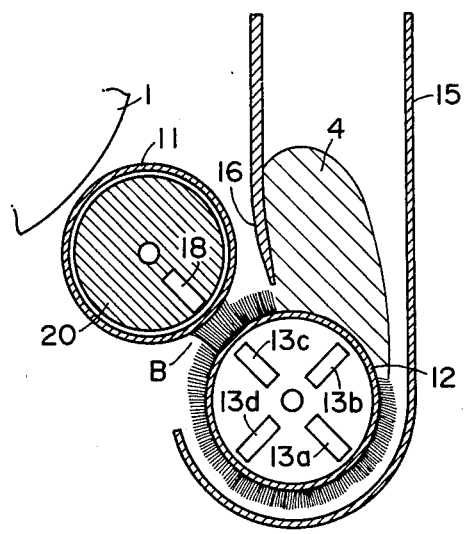
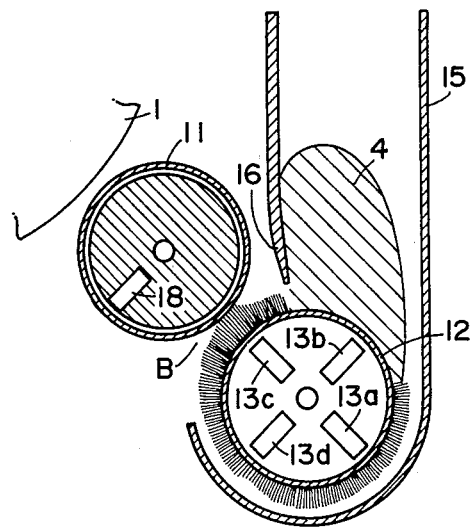
FIG. 10A · FIG. 10B

IMAGE DEVELOPING METHOD AND DEVICE THEREFOR

BACKGROUND OF THE INVENTION

1. Field of the Invention

The present invention relates to a developing method and a device therefor for developing an electrostatic latent image with one-component magnetic developer.

2. Description of the Prior Art

There are already known various developing methods utilizing one-component developer. Among these particularly noteworthy is so-called toner transition development, in which one-component developer applied as a thin uniform layer on developer bearing means is brought into facing relationship to an electrostatic latent image bearing surface with a small clearance therebetween whereby the developer is caused to fly from said developer bearing means to the image bearing surface by the electrostatic attractive force to perform image development, as disclosed in the Japanese Patent Publication No. Sho 41-9475 and in the U.S. Pat. No. 2,839,400. Such developing method assures satisfactory development completely without background fog as the developer is not attracted nor brought into contact with the non-image area having no image potential. Besides, the absence of carrier particles eliminates the troubles arising from the change in mixing ratio thereof in the developer or from the time-dependent deterioration of the carrier particles.

Furthermore, the present applicant proposed novel developing methods as disclosed in the U.S. Patent Applications Ser. Nos. 938,101 and 938,494, and Ser. Nos. 58,434 and 58,435.

The former method is featured in positioning one-component magnetic developer, a developer bearing non-magnetic means and a magnetic field generating means in this order to form a thin uniform layer of said developer on said developer bearing means under the effect of the magnetic field generated by said magnetic-field generating means, and maintaining said thin developer layer in facing relation to an electrostatic latent image bearing surface with a small clearance therebetween thereby extending the developer corresponding to the image area by the electrostatic attractive force of said latent image to perform the image development. This method also is capable of providing a completely fog-free visible image as the development is carried out without contact of the developer with the non-image area.

The latter method is featured in positioning one-component magnetic developer, a developer bearing non-magnetic means and a magnetic field generating means in this order to form a thin uniform layer of said developer on said developer bearing means under the effect of the magnetic field generated by said magnetic-field generating means, and maintaining said thin developer layer in facing relation to an electrostatic latent image bearing surface with a small clearance therebetween, wherein the image development is effected by applying an AC developing bias voltage across said clearance between the image bearing surface and developer bearing means and changing said clearance in time. In this method the developer reaches also the non-image area in the initial stage to effect the development of halftone image but reaches only the image area in the later stage, thereby providing the image without background fog and with improved halftone reproducibility in comparison with the above-explained method.

As explained in the foregoing, the developing methods in which a thin layer of one-component developer is faced to the latent image bearing surface are far superior to other conventionally known methods in terms of the developing performance, image reproducibility, service life of the developer etc.

These developing methods, different from the brush development in which brush-shaped developer is maintained in sweeping contact with the latent image bearing surface to obtain a visible image, utilize a thin layer of developer which is spaced from the latent image bearing surface in the absence of an externally applied electric field. FIG. 1 shows an example of developing device employed in such developing method, wherein shown are a latent image bearing member 1, a sleeve roller 2 internally provided with fixed magnetic poles 2a-2d, a fixed magnetic doctor blade 3, a one-component magnetic developer 4, a container 5 therefor, a scraper 6 for removing the developer from the surface of said sleeve roller, and an AC bias voltage source 7 as described in the aforementioned U.S. Patent Applications Ser. Nos. 58,434 and 58,435. In such device the magnetic pole 2b positioned inside the sleeve 2 and said magnetic blade 3 provide a strong magnetic field for obtaining a practical thin developer layer of 50–100μ in thickness, and the insulating one-component developer is subjected to frictional charging through contact with the rotating sleeve 2 and is defined in thickness by the magnetic field present between the sleeve 2 and the blade 3 before being supplied to the developing area D. The clearance between the sleeve 2 and the blade 3 is an important factor in forming a strong magnetic field and has to be as narrow as 200 to 400μ, for example for forming a flux density of 800 gauss on the sleeve, corresponding to the above-mentioned layer thickness. For this reason the magnetic blade 2 has to be finished with a high precision at the pointed end thereof. Also the magnetic thickness defining in said narrow clearance causes a strong distortive force in the developer 4 leading to developer caking and thus giving rise to a streak in the developer layer. Such a streak is also caused by foreign matter stuck in said clearance. Also certain developers cannot satisfactorily fill the already consumed portions of the developer layer, thus leading to the so-called sleeve ghost phenomenon. Furthermore, incidentally aggregated developer, if deposited on the sleeve 2, creates a relatively thick developer layer around such aggregate, which can hardly be restored to the thin state even after many turns of the sleeve. Also the amount of charge on the developer, which is generally determined by the frictional charging between the sleeve 2 and the insulating developer, becomes reduced after prolonged use as the sleeve surface is covered by minute particles of resin employed in the developer, eventually leading to so-called sleeve deterioration involving insufficient developer application on the sleeve. For these reasons there is often needed scraping means, as the scraper 6 in FIG. 1, for removing the developer from the sleeve 2 before developer application.

SUMMARY OF THE INVENTION

The object of the present invention is to provide a developing method and a device therefor capable of avoiding the aforementioned drawbacks, particularly the troubles arising from the use of a narrow clearance or strong magnetic field mentioned above.

Another object of the present invention is to provide a developing device with relatively loose requirements for the precision of component parts and assembly thereof.

Still another object of the present invention is to provide a developing method and a device therefor capable of removing the aggregated developer and foreign matters deposited on the surface of developer bearing means such as a developing sleeve in the course of rotation thereof without particular developer scraping means coming into direct contact with said developer bearing means and or restoring a thin developer layer thereon.

Still another object of the present invention is to provide a developing method and a device therefor capable of preventing the aggregation of developer while the developing sleeve is stopped.

The foregoing objects are achieved according to the present invention by:

a developing method in which one-component magnetic developer is transported on a developer bearing member to a developing position for image development, featured in supplying said developer onto a developer-feeding bearing member to form thereon a magnetic brush of developer under the effect of a magnetic field, then bringing said magnetic brush into contact with the surface of an image-developing developer bearing member to form thereon a thin uniform layer of the developer, and bringing said thin layer to a developing position to develop an electrostatic latent image formed on a latent image bearing surface;

a developing method as described above wherein said thin layer of the developer is so spaced in the developing position from the latent image bearing surface as to form a clearance therebetween, across which an AC bias electric field is applied;

a developing device adapted for transporting one-component magnetic developer on a developer bearing member to a developing position for image development, comprising a developer-feeding bearing member for supporting said magnetic developer thereon, a magnetic-field generating means for forming a magnetic brush of said developer on said bearing member, an image-developing developer bearing member so positioned as to be in contact with said magnetic brush, means for positioning said developer-feeding bearing member in the proximity of said image-developing bearing member, and means for displacing said image-developing bearing member to transport said thin developer layer to the developing position;

a developing device as described above wherein said image-developing bearing member is provided with magnetic members;

a developing device as described above wherein said magnetic developer is insulating developer;

a developing device as a preferred embodiment of the present invention, adapted for forming a magnetic brush of one-component developer on a first sleeve roller internally provided with fixed magnetic poles, and bringing said magnetic brush into contact with the surface of a second developing roller for transporting the developer to a developing position, thereby causing frictional charging of insulating developer and thus forming a thin developer layer on said developing roller; and a developing method and a device therefor featured in forming a magnetic brush of one-component magnetic developer on a developer-feeding bearing member by means of a magnetic field, bringing said magnetic brush into contact with the surface of an image-developing bearing member positioned in the proximity of a surface to be developed thereby forming a thin developer layer on said image-developing bearing member, transporting said thin developer layer to a developing position to develop said surface, and regulating said magnetic brush present in a portion of said developer-feeding bearing member facing said image-developing bearing member in such a manner as to reduce the developer density in said facing portion after the completion of image development but prior to the termination of displacement of said image-developing bearing member.

The foregoing and still other objects and advantages of the present invention will be made apparent from the following description to be taken in conjunction with the attached drawings.

BRIEF DESCRIPTION OF THE DRAWINGS

FIG. 4 is a cross-sectional view showing another embodiment of the developing device of the present invention;

FIG. 5 is a magnified view of the developer application in the developing device shown in FIG. 4;

FIGS. 6 and 7 are schematic cross-sectional view showing other embodiments of the developing device of the present invention;

FIGS. 8A, 8B, 9A, 9B, 10A, 10B, 11A, 11B, 11C, 12A and 12B are schematic cross-sectional views showing still other embodiments of the developing device of the present invention.

DESCRIPTION OF THE PREFERRED EMBODIMENTS

Figure 2:
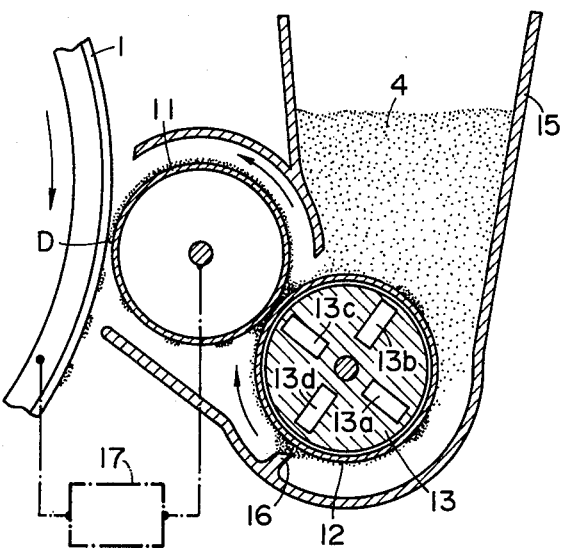
FIG. 2 is a cross-sectional view of an embodiment of the basic structure of the developing device of the present invention.

Now the present invention will be clarified in detail by the preferred embodiments thereof shown in FIG. 2 and other ensuing drawings.

Figure 1:
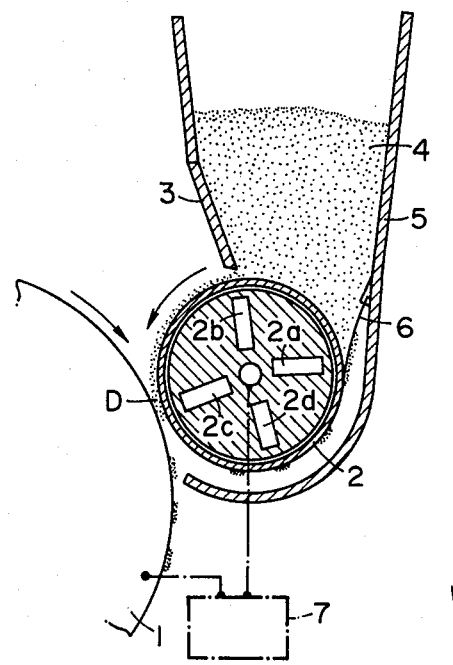
FIG. 1 is a cross-sectional view of an example of conventionally known developing devices.

FIG. 2 shows a first embodiment of the present invention, wherein a latent image bearing member 1 and one-component magnetic developer are the same as those shown in FIG. 1. An image-developing bearing member 11 or a developing sleeve, is provided in the proximity of said image bearing member 1 at such distance that a clearance is formed between said image bearing member and a thin developer layer to be formed on said developing sleeve 11 as will be explained in the following. A non-magnetic sleeve roller 12 is rotatably provided in facing relationship to and parallel to said developing sleeve with such a clearance thereto as will be explained in the following and as will be achieved by spacing means for example spacing rollers, and constitutes developer-feeding bearing member internally provided with a fixed magnet roll 13 having plural magnetic poles 13a–13d as illustrated. Suitable drive means are provided to drive said developing sleeve 11 anti-clockwise for causing a peripheral movement in the same direction as that of the latent image bearing member 1 and to drive said sleeve roller 12 clockwise for causing a peripheral movement in the same direction as that of said developing sleeve 11.

A doctor blade 16 is provided in the magnetic field generated by the magnetic pole 13d and with a small clearance from said sleeve roller 12, for limiting the height of the magnetic developer brush formed on said sleeve roller 12 under the effect of said magnet roll 13. Said developing sleeve 11 and developer-feeding sleeve roller 12 are made of such materials capable, in the frictional charging series, of furnishing a charge of a polarity opposite to that of the latent image to the one-component magnetic insulating developer 4 to be explained further in the following, and can for example be composed of metals such as stainless steel, aluminum, iron etc. or insulating materials such as synthetic resins satisfying the above-mentioned requirement.

As an example, said one-component magnetic insulating developer or toner can be of the following composition:

Styrene-maleic acid resin: 70 wt.%
Ferrite: 25 wt.%
Carbon black: 3 wt.%
Charge controlling agent: 2 wt.%
Colloidal silica: 0.2 wt.% (added externally)

A voltage source 17 for applying an AC bias field across the developing clearance is provided, thereby causing the thin developer layer on the developing sleeve to deposit on the image are of the latent image bearing member with improved tonal rendition, as described in the U.S. Patent Applications Ser. Nos. 58,434 and 58,435.

The one-component magnetic developer supplied from a container 15 is applied onto the surface of the sleeve roller 12 along with the rotation thereof to form magnetic brushes thereon under the effect of magnetic poles. Said magnetic brushes are formed by the magnetic poles 13a, 13b and magnetically transported in succession by the rotation of the sleeve roller 12, and limited in height by the blade 16 in a position facing the magnetic pole 13d. Subsequently in a position facing the developing sleeve 11, the magnetic brush is extended into vertical spikes under the effect or influence of the magnetic field from the pole 13c, and said spikes are agitated in contact with the surface of said developing sleeve 11 whereby said magnetic insulating developer is charged by friction with said surface to form a thin layer covering said surface. Said thin layer is transported with the rotation of the developing sleeve 11 to a developing position D for performing the image development as already explained in relation to FIG. 1.

Now there will be shown a preferred example of the above-explained embodiment.

EXAMPLE 1

The developing device shown in FIG. 2 was prepared with an aluminum blade 16 spaced by 1 mm from a stainless-steel sleeve roller 12 with a surface flux density of 800 gauss, which was in turn spaced by 1 mm from a stainless-steel developing roller 11. The device provided a thin layer, approximately 80$\mu$ in thickness, of a one-component developer showing a sufficient density as high as 1.60 in reflection density and also provided a sufficiently high density in the developed image.

As will be apparent from the foregoing example, the developing device of the present invention allows to employ a clearance between the developer defining member or blade 16 and the sleeve roller 12 more than two times larger than that in the conventional devices, and this fact reduces the frequency of caking even in easily aggregating developer such as microcapsule toner and the trouble of uneven developer application caused by the aggregated developer clogging the clearance between the blade 16 and sleeve roller 12. Also such wider clearance alleviates the precision requirements for the component parts and assembly thereof.

FIG. 4 shows another embodiment of the developing device of the present invention, wherein there are shown a sleeve roller 12 for forming magnetic developer brushes along the periphery thereof, magnetic poles 13a–13d fixed inside said sleeve roller 12, a developing sleeve 11, an applying station 19, a magnetic pole 18 positioned inside said developing sleeve 11, a blade 16, one-component insulating magnetic developer 4, and a thin developer layer 4' formed on said developing sleeve 11. The developer 4 in the form of a magnetic brush with a height defined by the blade 16 is transported along the periphery of the sleeve roller 12 and strongly collides with the surface of the developing sleeve 11 under the effect of a magnetic field generated by the magnetic pole 18 in the developing sleeve 11 and the magnetic pole 13c positioned inside the sleeve roller 12, whereby the developer is frictionally charged in the applying station 19 and thus attracted to the surface of developing sleeve 11 to form a thin layer 4' showing a satisfactory developing performance. In this manner the blade 16 and the sleeve roller 12 can be spaced by a clearance of 0.5 to 1.0 mm while said roller 12 and the developing sleeve 11 can be spaced by a clearance of 1.0 to 2.0 mm, thus alleviating the load applied to the developer in comparison with the conventional magnetic applying method utilizing a sleeve roller having internal fixed magnetic poles and a magnetic blade space therefrom by a narrow clearance in the order of 300$\mu$.

FIG. 5 is a partial magnified view of the embodiment shown in FIG. 4 wherein a magnetic pole 18 is positioned inside the developing sleeve 11 corresponding to the applying station 19. Said magnetic pole 18 may be replaced by a magnetic substance for achieving a same effect, though the following description will be concentrated on the case of using such magnetic pole.

Figure 3:
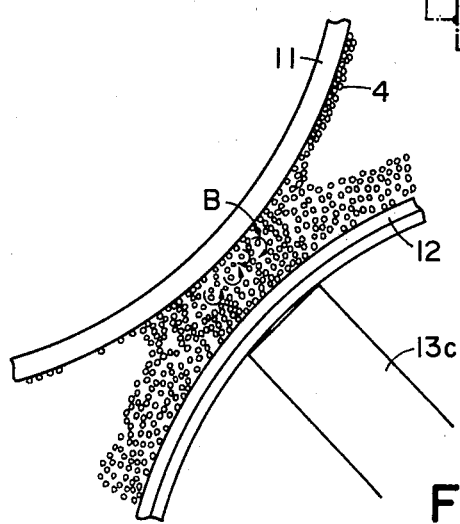
FIG. 3 is a magnified view of the developer application in the developing device shown in FIG. 2.

The embodiment shown in FIG. 5 provides more enhanced spikes of the magnetic brush in comparison with the embodiment shown in FIG. 3 not utilizing the internal magnetic pole in the developing sleeve 11 in the applying station 19, thus increasing the friction between the developing sleeve 11 and the developer and leading to additional advantages as will be explained in the following.

Firstly the amount of developer applied is increased to provide a thicker or visually denser developer layer, due to the stronger friction between the developer and the developing sleeve 11.

Secondly a stable application of a thin developer layer is rendered possible even when the sleeve roller 12 is spaced from the developing sleeve 11 by a widened clearance that would not bring the magnetic brushes into contact with the developing sleeve or roller 11 if in the absence of the magnetic pole therein. This fact is extremely effective in preventing the aggregation of easily aggregating developer for pressure fixation.

Thirdly, the ghost image eventually formed on the developing sleeve in certain developers is completely prevented by the use of an internal magnetic pole in the developing sleeve. This is due to the enhanced spike formation of the magnetic brushes B, which exhibit an effect of cleaning the surface of developing sleeve 11 and forming a developer layer anew by frictional charging. Also the magnetic brushes function to remove the aggregated developer eventually deposited on the developing sleeve 11, thus restoring a uniform thin layer, and constantly clean this surface of the developing sleeve 11, thus avoiding the time-dependent deterioration thereof. In this manner it is rendered possible to dispense with the developer scraping means which has often been necessitated for removing the developer from the developing sleeve.

Fourthly eventual streaks and unevenness present on the magnetic brushes on the sleeve roller 12 are erased by the enhanced spike formation in the applying station 19 and are therefore not reproduced on the developing sleeve 11.

EXAMPLE 2

In this manner the developing device of the present invention enables the developer application in a thin layer without the drawbacks associated with the conventional developing devices.

FIG. 6 shows another embodiment of the present invention wherein the same components as those in the foregoing embodiments are represented by the same numbers. In this embodiment provided is a non-magnetic bearing belt 21 so positioned and movable supported as to face a latent image bearing member with such a small clearance therebetween that a thin developer layer formed on said belt is slightly separated from said latent image bearing member in the absence of bias field therebetween. Pulleys 23a, 23b are provided for driving said belt 21 in such a manner that said developer layer moves in the same direction and at substantially the same speed with said latent image bearing member at the mutually facing position.

A non-magnetic belt 22 for bearing magnetic brushes is provided with magnets 25 therein and is driven by pulleys 24a, 24b in the direction of arrow. It is also possible to employ a magnetic belt 22 for magnetically transporting the magnetic developer 4. Magnets 26 are positioned inside said non-magnetic belt 22 and in opposed relation to said belt 22 to perform the same function as already explained in relation to FIGS. 4 and 5, whereby the magnetic developer brushes supported on said belt 22 are brought into contact with the belt 21 to form thereon a thin layer of magnetic developer which is then transported to the developing station D to perform the image development by the aforementioned principle.

There may be additionally provided an unrepresented blade for defining the height of magnetic brushes formed on the belt 22. Also preferred is the development with an external AC bias field as proposed in the U.S. Patent Application Ser. No. 58,435.

FIG. 7 shows a variation of the embodiment shown in FIG. 6, wherein the same components as those in FIG. 6 are represented by the same numbers. A non-magnetic rotary sleeve 31 is provided therein with a magnet roll 32 and functions to transport insulating magnetic developer 4 by the effect of magnetic field, said developer being supplied from a container 33. The magnetic developer brushes formed on said sleeve 31 are brought into contact with a non-magnetic belt 21 to form a thin developer layer by frictional charging on said belt, said developer layer being transported to the developing station for performing the image development according the aforementioned principle.

The present invention is not limited to the foregoing embodiments but provides in general manner a developing method in which one-component magnetic developer is transported on a developer bearing member to a developing position for image development, featured in supplying said developer onto a developer-feeding non-magnetic bearing member to form thereon a magnetic brush of developer under the effect of a magnetic field, and bringing said magnetic brush into contact with the surface of an image-developing developer bearing member to form thereon a thin uniform layer of the developer for effecting the image development, and a developing device for conducting image development with one-component magnetic developer transported to a developing position on a developer bearing member, comprising a developer-feeding non-magnetic bearing member for supporting said magnetic developer, magnetic-field generating means for forming a magnetic brush of said developer on said bearing member, an image-developing bearing member so positioned as to come into contact with said magnetic brush, means for positioning said developer-feeding bearing member in the proximity of said image-developing bearing member, and means for driving said image-developing bearing member to transport said developer layer to the developing position, and therefore provides the following particular advantages.

(1) The image development is achieved with uniform density and with a minimum necessary amount of developer for image formation, avoiding all the drawbacks associated with the conventional developing methods and devices.

(2) A thin uniform developer layer can be formed on the image-developing bearing member without the use of a blade directly contacting said layer, thus avoiding the danger of aggregate formation at such blade.

(3) The developer is charged by friction between the magnetic developer brush and the image-developing bearing member, thus alleviating the load applied to the developer and enabling the use of easily coagulable developer for pressure fixation.

The pressure-fixable developer, though advantageous in power economy by dispensing with the heating means required for the conventional heat-fixable developer, easily aggregates under pressure or an elevated load and has therefore to be maintained free of excessive pressure in the process steps prior to the image fixation. Such pressure-fixable developer is represented for example by microcapsule toner composed of an easily fixable core material covered with a shell resin, as disclosed in the Japanese Patent Publication Nos. Sho49-1588 and Sho51-35867. The developing device of the present invention allows the use of such toner without any trouble and provides a thin uniform developer layer, thus eliminating the eventual unevenness in the developed image resulting from the uncoated streaks or unevenness in said developer layer.

(4) The developing device of the present invention does not require additional means, such as a scraper, for removing the remaining developer from the bearing member, thus enabling a simpler structure of the device and avoiding the danger of developer caking in the vicinity of such scraper.

In the foregoing embodiments there however remains a drawback requiring further consideration. In the embodiment shown in FIG. 4, in contrast to the aforementioned advantages achievable in the course of developing process in which the magnetic brush sleeve roller 12 and the developing sleeve 11 are both rotated, the developing sleeve 11 in a stopped state may develop a thick aggregated developer layer corresponding to the applying station 19, which may remain for a considerable period after the start of developing process despite the cleaning effect of the magnetic brushes. Such abnormality in the developer layer becomes visible in the developed image and should therfore be eliminated.

Such difficulty can be eliminated by regulating the density of the magnetic brush, before the movement of the developer-feeding bearing member is terminated, in such a manner as to decrease the length or intensity of said brush thereby controlling the load applied to the developer in the applying station 19.

In the following explained are embodiments capable of such density regulation of the magnetic brush, wherein the same components as those shown in FIG. 2 or FIG. 4 are represented by the same numbers and are omitted from the explanation. The AC bias source 17 shown in FIGS. 2 and 4 is preferably incorporated though it will not be particularly explained in the following embodiments.

FIGS. 8A and B show an embodiment in which the blade 16 is displaceable between a position (FIG. 8(A)) during the developing process and a position (FIG. 8(B)) after the completion thereof. After the completion of developing process, the blade 16 is positioned closer to the magnetic brush sleeve roller 12 as shown in FIG. 8B, whereby the magnetic brush becomes shorter in length and is no longer in contact with the developing roller 11. The blade 16 is returned to the original position shown in FIG. 8A at the re-start of the developing process whereby it is rendered possible to constantly obtain a thin uniform layer without developer aggregation. Though FIG. 8B shows a state in which the magnetic brush is completely separated from the developing sleeve 11, sufficient prevention of aggregation can be achieved if the length of brush is reduced to an extent that it only lightly touches the developing sleeve 11.

Such approaching and retraction motion of the blade 16 to and from the sleeve roller 12 can be achieved by an already known mechanism, for example a cam mechanism as shown in FIG. 8B and provided with a cam 34 and a cam follower arm 35 suporting said blade 16 and constantly biased toward the sleeve roller 12 by means of a compression spring 36, wherein the cam 34 is activated to the state shown in FIG. 8B by means of a suitable signal obtained after the completion of developing process but prior to the termination of the copying operation.

FIGS. 9A and 9B show an embodiment in which the magnetic brush is formed on the sleeve roller 12 by a blede 16 composed of a magnetic material, wherein the length of said magnetic brush is shortened by the displacement of a counter magnetic pole 13' for said blade 16 from a position during the developing process as shown in FIG. 9A to a position after the developing process as shown in FIG. 9B. During the developing process (FIG. 9A) the magnetic pole 13' is displaced in the transporting direction of the developer from the magnetic blade 16 to provide a magnetic brush of a length sufficient for forming a thin developer layer on the developing sleeve 11, but after the developing process the magnetic pole 13' is positioned almost vertically below the blade 16 as shown in FIG. 9B to from a much thinner developer layer on the sleeve roller 12, thus avoiding the developer aggregation in the applying station B.

Such displacement of the magnetic pole 13' can be achieved by a known mechanism, for example by displacing a magnet 13' movably mounted on the magnet roll 13, from the position (A) to (B) after the termination of the developing process. In case of the absence of such magnet roll 13, the magnetic pole 13' has to be made displaceable with respect to the device.

FIGS. 10A and 10B show an embodiment in which the magnetic pole 18 positioned inside the developing sleeve as shown in FIG. 10A is displaced from the applying station B after the completion of the developing process as shown in FIG. 10B. In this case the length of the magnetic brush after the blade 16 remains unchanged, but the developer aggregation during the standstill state of the developing sleeve 11 is prevented since the spike formation in the applying station B is no longer present.

Such displacement of the magnetic pole 18 can be achieved by rotating a magnet roll 20 for suppporting said magnetic pole 18 by a determined amount after the completion of the developing process to the position shown in FIG. 10B, or in the absence of such magnet roll 20, by displacing said magnetic pole 18 itself.

Figure 11A:
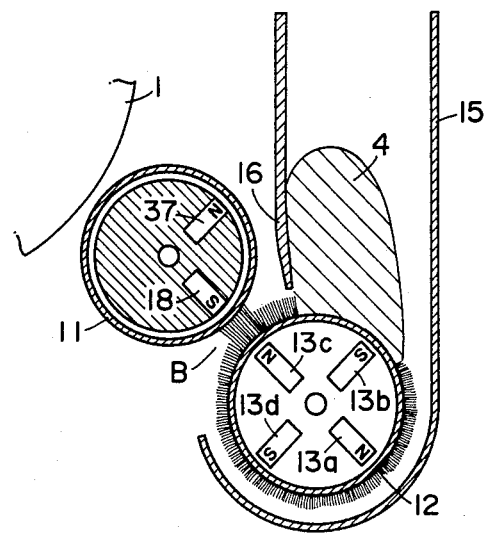
Figure 11B:
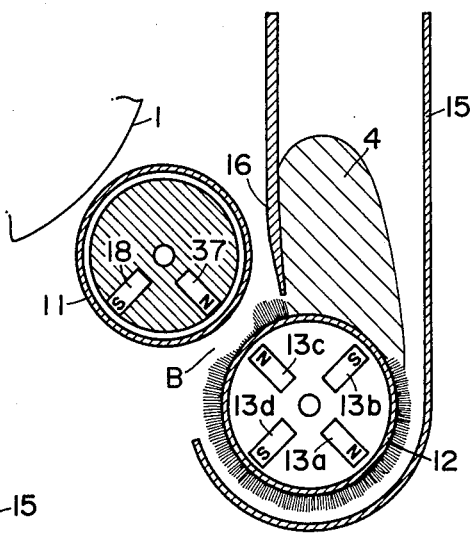

FIGS. 11A and 11B shown another embodiment in which the developer aggregation is prevented by changing the mutually attracting magnetic field in the applying station during the developing process to a mutually repulsive magnetic field after the termination of the developing process. Such repulsive magnetic field can be obtained in the applying station B by shifting a magnetic pole 37, provided inside the developing sleeve 11 for this purpose, to said applying station B after the termination of the developing process, as shown in FIG. 11B.

Figure 11C:
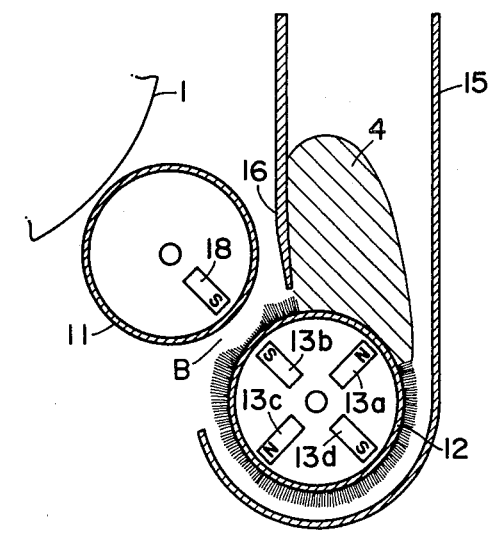

Similarly a suitable magnetic pole inside the magnetic brush sleeve roller 12 may be rotated to a position shown in FIG. 11C for achieving the same purpose of aggregation prevention. Such displacement of the magnetic pole 18, 37 or 13 is also achievable by a known mechanism.

Figure 12A:
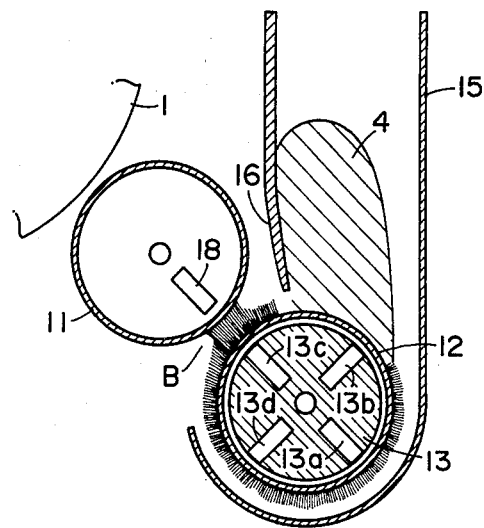
Figure 12B:
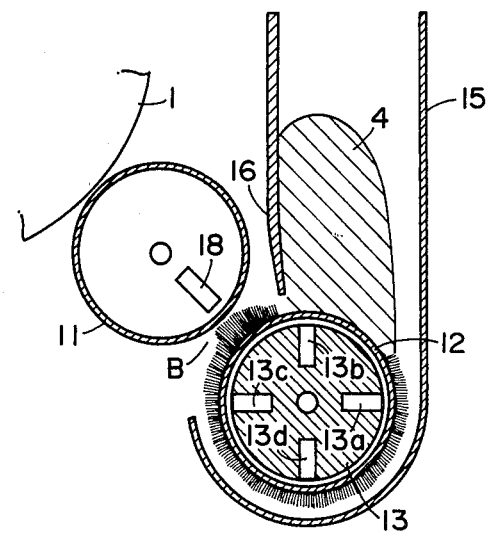

FIGS. 12A and 12B shown an embodiment in which the magnetic poles inside the magnetic brush sleeve roller 12 are displaced from the applying station B after the completion of the developing process, thereby reducing the spike formation at said station B and thus preventing the aggregation of developer on the developing sleeve 11 during the stopped state thereof.

For this purpose the magnetic poles $13a$-$13d$ are mounted or magnetized on the magnet roll 13, which as explained in the foregoing embodiments shown in FIGS. 9, 10 and 11 is rotated by a known drive means.

In the foregoing embodiments, the displacement of the blade 16 or magnetic poles has to be achieved after the completion of developing process but before the developing sleeve 11 comes to a standstill, and the effect of such displacement is almost negligible if it is conducted after the developing sleeve 11 is already stopped.

As explained in the foregoing, the developing device of the present invention is capable of stably providing a thin uniform developer layer without the aggregation of developer onto the developing sleeve, which has not been avoidable in the conventional devices.

There is observed a general trend for the increased use of one-component insulating magnetic developer and pressurefixable developer in place of conventional heat-fixable developer for power economy in the future, but such new developer are susceptible to pressure and load, easily leading to the aggregation on the developing sleeve. As an example of such developer there is known so-called microcapsule toner composed of an easily fixable core material covered with a shell resin, as disclosed in the Japanese Patent Publication Nos. Sho49-1588 and Sho51-35867, but the developing method and device of the present invention allows uniform image development with such developer without the danger of coagulation thereof.

The present invention is not limited to the foregoing embodiments, and the image-developing cylindrical bearing member and/or the developer-feeding bearing member can be replaced by endless belts or other suitable means.

What we claim is:

1. A method for developing a latent image on the surface of a latent image bearing member, comprising the steps of:
    forming a magnetic brush of one-component magnetic developer on a developer-feeding member under the influence of a magnetic field;
    bringing said magnetic brush into contact with the surface of an image-developing member positioned in the proximity of the surface to be developed thereby forming a thin developer layer on said image-developing member;
    transporting said thin developer layer to a developing position for performing image development on said surface; and
    regulating the magnetic brush present in the mutually opposed portions of said developer-feeding member and said image-developing member to reduce the density of developer present in said mutually opposed portions after the completion of a developing process but prior to the termination of displacement of said image-developing member.

2. A developing method according to claim 1, wherein the image development is conducted by said thin developer layer spaced in the developing position from the latent image bearing surface by a clearance therebetween.

3. A developing method according to claim 2, wherein an AC bias electric field is applied across said clearance.

4. A developing device for developing a latent image on a latent image bearing member, comprising:
    an image-developing member for supporting one-component magnetic developer on the periphery thereof;
    means for displacing said image-developing member for transporting a layer of said developer to a developing portion;
    a developer-feeding member positioned in the proximity of said image-developing member; and
    magnetic-field generating means positioned opposite to said image-developing member with said developer-feeding member extending therebetween, said magnetic-field generating means having a magnetic pole in facing relationship to said image-developing member for forming a magnetic brush on said developer-feeding member in such a manner that said magnetic brush comes into contact with said image-developing member to form a thin developer layer thereon.

5. A developing device according to claim 4, further comprising a magnetic member positioned inside said image-developing member so as to be in facing relationship to said magnetic pole for forming the magnetic brush.

6. A developing device for developing a latent image on a latent image bearing member, comprising:
    a image-developing member for supporting one-component magnetic developer on the periphery thereof;
    means for displacing said image-developing member for transporting a layer of said developer to a developing position;
    a developer-feeding member positioned in the proximity of said image-developing member;
    magnetic-field generating means positioned opposite to said image-developing member across said developer-feeding member, said magnetic-field generating means having a magnetic pole in facing relationship to said image-developing member for forming a magnetic brush on said developer-feeding member in such a manner that said magnetic brush comes into contact with said image-developing member to form a thin developer layer thereon; and
    a magnet positioned inside said magnetic pole for forming the magnetic brush.

7. A developing device according to claim 4, wherein said image-developing member and said developer-feeding member are formed as belts.

8. A developing device according to claim 5, wherein said image-developing member is formed as a belt, while said developer-feeding member is formed as a cylindrical sleeve.

9. A developing device for developing a latent image on a latent image bearing member, comprising:
    an image-developing member for supporting one-component magnetic developer on the periphery thereof;
    means for displacing said image-developing member for transporting a layer of said developer to a developing position;
    a developer-feeding member positioned in the proximity of said image-developing bearing member;
    magnetic-field generating means positioned opposite to said image-developing member with said developer-feeding member extending therebetween, said magnetic-field generating means having a magnetic pole in facing relationship to said image-developing member for forming a magnetic brush on said developer-feeding member in such a manner that said magnetic brush comes into contact with said image-developing member to form a thin developer layer thereon; and
    regulating means for regulating the magnetic brush in the mutually facing portions of said developer-feeding member and said image-developing member to control the developer density in the developing position after the completion of a developing process but prior to the termination of displacement of the image-developing member.

10. A developing device according to any one of claims 4 to 9, further comprising a member for defining the thickness of developer positioned in facing relation to said developer-feeding member with a clearance therebetween.

11. A developing device according to any one of the claims 4 to 9, wherein the surface of said image-developing member is composed of a material capable, in the triboelectric series, of charging said developer to a polarity opposite to that of the latent image potential.

12. A developing device according to any one of claims 4 to 9, wherein said one-component magnetic developer is electrically insulating.

13. A developing device according to any one of claims 4 to 9, wherein said image-developing member and said developer-feeding member are so mutually spaced that the thin developer layer on said image-developing member is spaced by a clearance from the latent image bearing surface.

14. A developing device according to claim 13, wherein an AC bias electric field is applied across said clearance.

15. A developing device according to claim 9, wherein said regulating means for magnetic brush comprises a doctoring blade which is displaced from a position during the developing process to another position closer to the developer-feeding member after the completion of the developing process.

16. A developing device according to claim 9, wherein said regulating means for the magnetic brush comprises a magnetic pole positioned inside said developer-feeding means in facing relation to a magnetic doctoring blade, said magnetic pole being displaced from a position during the developing process to another position for reducing the height of said magnetic brush after the completion of the developing process.

17. A developing device according to claim 9, wherein said regulating means for magnetic brush comprises a magnetic pole or a magnetic member positioned inside said image-developing member in facing relation to the magnetic pole for forming the magnetic brush, said magnetic pole or magnetic member being displaced from a position during the developing process to another position more distant from said developer-feeding member after the completion of the developing process.

18. A developing device according to claim 9, wherein said regulating means for magnetic brush comprises a magnetic pole positioned inside said image-developing member in facing relation to said magnetic pole for forming said magnetic brush and another magnetic pole of opposite polarity also positioned inside said image-developing member, said magnetic poles being so shifted after the completion of the developing process as to generate a repulsive magnetic field.

19. A developing device according to claim 9, wherein said regulating means for magnetic brush comprises a magnetic pole for forming a magnetic brush positioned inside said developer-feeding member and in facing relation to said image-developing member and another magnetic pole of the opposite polarity also positioned in said developer-feeding member, said magnetic poles in said developer-feeding member being so shifted after the completion of the developing process as to form a repulsive magnetic field.

20. A developing device according to claim 9, wherein said regulating means for the magnetic brush comprises a magnetic pole for forming a magnetic brush positioned inside said developer-feeding member and in facing relation to said image-developing member, said magnetic pole being displaced from a position during the developing process to another position more distance from said image-developing member after the completion of the developing process thereby removing the magnetic pole from the portion of said developer-feeding member facing said image-developing member.

* * * * *

UNITED STATES PATENT AND TRADEMARK OFFICE
CERTIFICATE OF CORRECTION

PATENT NO. : 4,385,829
DATED : May 31, 1983
INVENTOR(S) : KIMIO NAKAHATA, ET AL.

It is certified that error appears in the above-identified patent and that said Letters Patent is hereby corrected as shown below:

Column 4, line 33, "view" should read --views--.

Column 5, line 26, "are" should read --area--.

Column 9, line 51, "blede" should read --blade--;
         line 63, "from" should read --form--.

Column 10, line 22, "shown" should read --show--;
          line 39, "shown" should read --show--.

Column 12, line 3, Claim 6, "a" should read --an--;
          lines 22,23, Claim 6, should read --a magnet positioned inside said image-developing member in facing relationship to said magnetic pole for forming the magnetic brush.--
          line 64, Claim 11, delete "the".

Column 14, lines 28,29, Claim 20, "distance" should read --distant--.

Signed and Sealed this

Sixth Day of December 1983

[SEAL]

Attest:

GERALD J. MOSSINGHOFF

*Attesting Officer*         *Commissioner of Patents and Trademarks*